No. 635,650. Patented Oct. 24, 1899.
H. T. BROWN.
BRAKE FOR STREET CAR TRAILERS.
(Application filed Apr. 28, 1899.)
(No Model.)
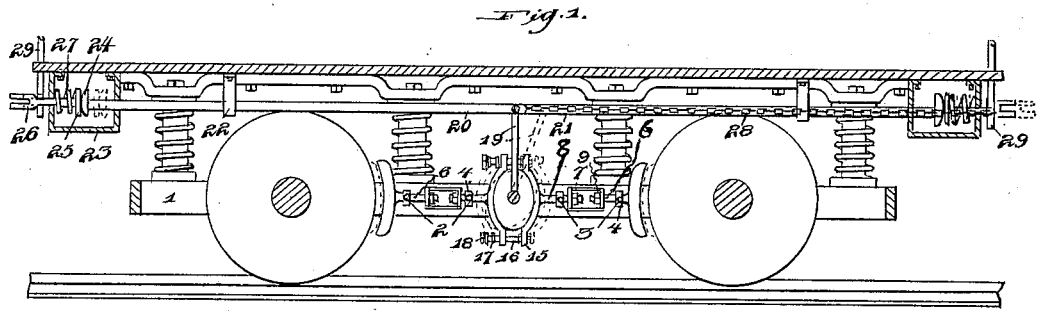
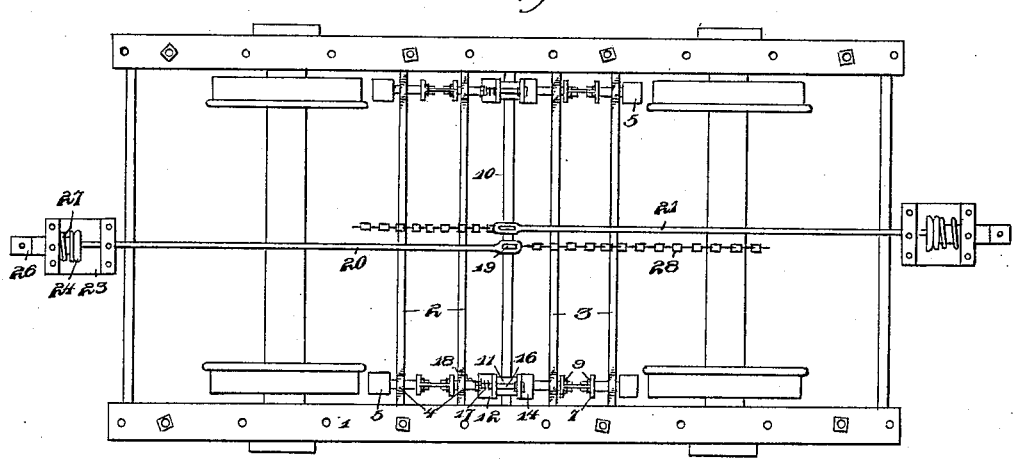
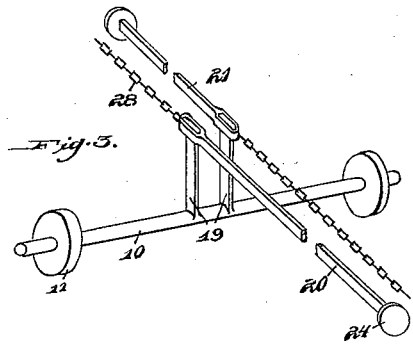
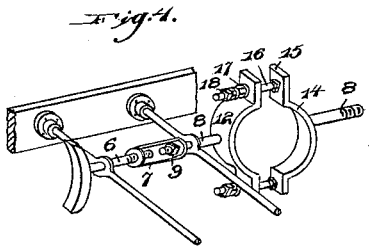
WITNESSES:
INVENTOR
H. T. Brown.
BY
ATTORNEYS.
THE NORRIS PETERS CO., PHOTO-LITHO., WASHINGTON, D. C.

UNITED STATES PATENT OFFICE.

HENRY T. BROWN, OF WILKINSBURG, PENNSYLVANIA.

BRAKE FOR STREET-CAR TRAILERS.

SPECIFICATION forming part of Letters Patent No. 635,650, dated October 24, 1899.

Application filed April 28, 1899. Serial No. 714,776. (No model.)

*To all whom it may concern:*

Be it known that I, HENRY T. BROWN, a citizen of the United States of America, residing at Wilkinsburg, in the county of Allegheny and State of Pennsylvania, have invented certain new and useful Improvements in Brakes for Street-Car Trailers, of which the following is a specification, reference being had therein to the accompanying drawings.

This invention relates to certain new and useful improvements in brakes, and relates particularly to that class of brakes employed on street-cars and like public vehicles or conveyances.

The invention has for its object to construct a brake of this class in which the power for operating the brake-shoes will be applied to the center of the shoe, so as to cause the same to engage the tread of the wheel with equal pressure over the entire engaging face of said shoe.

This invention is especially adapted for use in connection with "trailers," and it aims to provide a brake for this class of car which will be operated by the retarding movement of the front or motor car allowing the trailer to jam against the same.

A further object of this invention is to provide novel means for imparting an equal and simultaneous pressure to each of the brake-shoes.

Further objects of my invention will appear as the same is disclosed in detail in the following specification, in which reference will be had to the accompanying drawings, forming a part thereof and wherein like numerals will be employed to indicate corresponding parts throughout the specification.

In the drawings, Figure 1 is a longitudinal sectional view of a truck with my improved brake applied thereto. Fig. 2 is a top plan view of a truck with the brake in position. Fig. 3 is a perspective view of the operating-shaft and ellipses, showing a part of the operating rods and chains. Fig. 4 is a perspective view of a part of the supporting mechanism for the brake-shoe, showing a shoe and the strap engaging the ellipses.

Referring now to the drawings by reference-numerals, 1 indicates the side rails of the truck-frame, in which are secured two pairs of transversely-extending supporting-rods 2 and 3, provided near each end with journals 4. Each of the brake-shoes 5 is provided with a rod or stem 6, connected to the rear face of the shoe centrally thereof and having the free end screw-threaded into the end of a turnbuckle 7. This rod or stem extends through the journal in one of the supporting-rods, while the journal of the remaining rod of each pair receives a rod 8, connected at one end to the strap which engages the operating-eccentric and has its other end connected by a nut 9 to the turnbuckle 7.

Journaled in the side rails 1, midway between the front and rear pair of wheels, is an operating-shaft 10, having mounted thereon, in alinement with the wheels, a pair of ellipses 11, which operate the brake-shoes to move the same into engagement with the wheels when the operating-shaft 10 is operated. These ellipses are engaged on the periphery by a strap formed of two similar-shaped members 12 14, the former having the rod 8 connected thereto and the latter having the rod 8 for the opposite brake-shoe. The two members of the strap have their ends formed into lugs or ears 15 to receive securing-bolts 16, upon which are mounted retracting-springs 17 between the outer face of the one strap and the securing-nut 18. These springs serve to return the brake-shoes to their normal position when the pressure is relieved.

For operating the shaft 10 I secure centrally thereof a pair of vertical arms or levers 19, one of which is for the brake-shoes of one pair of wheels and the other for the brake-shoes of the opposite pair of wheels. Connected to the upper ends of these levers or arms 19 are the buffer-bars 20 and 21, the former extending toward one end of the car and the latter toward the other end, so that the brake may be operated from either direction. The buffer-bars are suitably supported in guides 22, connected to the under side of the car, and extend into a box or casing 23, also secured to the underneath face of the car near each end. The free ends of these bars have a disk 24 arranged thereon, which engages a similar disk 25, secured on the rear end of the coupler 26, extending through the front wall of the box or casing 23. A retracting-spring 27 is arranged on this coupler between the said front wall of the casing and the buffer-disk 25.

In order to permit the operating of the brake by hand, I attach to the connected ends of the bars 20 21 operating-chains 28, which at their other end are connected to and adapted to be wound upon the vertical brake-shafts 29, which are journaled in the platform of the car and operated in any of the well-known manners.

The operation may be briefly described as follows: The brake being applied to the motor-car and the movement thereof thereby retarded, the trailer-car, by reason of retarding movement having been imparted thereto, is jammed against the motor-car, causing the coupler to be depressed and move either the bar 20 or 21, as the case may be, inwardly, actuating the arm or lever 19 and the shaft 10, causing the ellipse 11 to separate the two members of the strap and force the brake-shoes into engagement with the wheels. As the motor-car again moves forward the ellipse returns to the normal position, as shown in Fig. 1 of the drawings, by reason of the movement imparted to the same not having been sufficient to carry the same to a horizontal central line.

The brakes may be readily applied by hand by turning the brake-shaft 29, so as to wind the chain 28 thereon and actuate the arms 19, shaft 10, and ellipses 11 in the same manner as above described.

It will be noted that various changes may be made in the details of construction without departing from the general spirit of my invention.

Having thus fully described my invention, what I claim as new, and desire to secure by Letters Patent, is—

1. In a brake of the class described, the combination with a truck, of a series of supporting-rods journaled in the side rails of said truck, brake-shoes each having a stem or rod connected thereto and journaled in a pair of the said supporting-rods, an operating-shaft journaled in the side rails of the truck, a pair of ellipses secured to said rod, an expansible strap engaging the periphery of said ellipses, a coupler, and connections between said coupler and the operating-shaft for moving the latter to operate the ellipses and force the brake-shoes into engagement with the wheels of the truck, substantially as described.

2. In a brake of the class described, the combination with a truck, of two pairs of supporting-rods journaled in the side rails of said truck and provided with journals near their ends, brake-shoes each having a stem connected thereto and engaging in the journals of one pair of said rods, an operating-shaft journaled in the side rails of said truck, a pair of ellipses mounted on said shaft near its ends, expansible spring-retracted straps engaging said ellipses, said straps carrying stems having connections with the stems of the brake-shoes, a pair of arms connected to said shaft, buffer-bars connected to the upper ends of said arms, and a coupler or draw-bar engaging the free ends of said buffer-bars, substantially as described.

3. A brake for trailer-cars comprising in combination with the truck, a series of supporting-rods journaled in the side rails of the truck, brake-shoes each having a stem connected thereto and journaled in a pair of the said supporting-rods, an operating-shaft journaled in the side rails of the truck, a pair of ellipses mounted on said shaft near its ends, expansible straps engaging said ellipses and consisting of two equal members connected together, connections between the members on one side of the ellipses and the brake-shoes of one pair of wheels, and connections between the members on the opposite side of the ellipses and the brake-shoes of the opposite pair of wheels, and means connected to the operating-shaft for causing the ellipses to separate and force the brake-shoes against the wheels, substantially as described.

In testimony whereof I affix my signature in the presence of two witnesses.

HENRY T. BROWN.

Witnesses:
JOHN NOLAND,
E. W. ARTHUR.